United States Patent
Putcha et al.

(10) Patent No.: US 11,634,083 B2
(45) Date of Patent: Apr. 25, 2023

(54) ADJUSTABLE TRUCK COMPARTMENT SYSTEM

(71) Applicant: Walmart Apollo, LLC, Bentonville, AR (US)

(72) Inventors: Sai Phaneendra Sri Harsha Viswanath Putcha, Bentonville, AR (US); Amit Batra, Foster City, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 106 days.

(21) Appl. No.: 17/174,148

(22) Filed: Feb. 11, 2021

(65) Prior Publication Data
US 2021/0188179 A1    Jun. 24, 2021

Related U.S. Application Data

(63) Continuation of application No. 16/021,725, filed on Jun. 28, 2018, now Pat. No. 10,946,801.
(Continued)

(51) Int. Cl.
*B60R 5/04*    (2006.01)
*B65D 88/00*   (2006.01)
(Continued)

(52) U.S. Cl.
CPC ........... *B60R 5/045* (2013.01); *B60R 5/006* (2013.01); *B65D 88/005* (2013.01);
(Continued)

(58) Field of Classification Search
CPC .. B62D 33/048; B62D 33/042; B62D 88/005; B60P 3/205; B60P 7/14; B60R 5/045; B60R 5/006; B65D 88/745
(Continued)

(56) References Cited

U.S. PATENT DOCUMENTS

| 3,712,663 A | 1/1973 | Laven |
| 4,049,311 A | 9/1977 | Dietrich |

(Continued)

FOREIGN PATENT DOCUMENTS

| CN | 106926768 | 7/2017 |
| WO | 1991004928 | 4/1991 |
| WO | 2019013985 | 1/2019 |

OTHER PUBLICATIONS

International Search Report and Written Opinion for Application No. PCT/US2018/039973, dated Sep. 26, 2018. 10 pages.
(Continued)

*Primary Examiner* — Jason S Morrow
(74) *Attorney, Agent, or Firm* — Fitch, Even, Tabin & Flannery, LLP

(57) ABSTRACT

An example adjustable truck compartment is described. The truck compartment includes a first side wall including a first guiding rail extending between a proximal end and a distal end, and a second side wall disposed opposite from the first side wall, the second side wall including a second guiding rail extending between a proximal end and a distal end of the second side wall. The truck compartment includes a rear wall coupled to the distal ends of the first and second side walls to define an enclosure between the first side wall, the second side wall, and the rear wall. The truck compartment includes a first divider panel configured to be received by the first and second guiding rails and within the enclosure in an orientation parallel to a floor of the enclosure to separate the enclosure into a first enclosure volume and a second enclosure volume.

12 Claims, 8 Drawing Sheets

Related U.S. Application Data

(60) Provisional application No. 62/530,915, filed on Jul. 11, 2017.

(51) Int. Cl.
  | | |
  |---|---|
  | *B65D 88/74* | (2006.01) |
  | *B60R 5/00* | (2006.01) |
  | *B65D 90/02* | (2019.01) |
  | *B65D 5/72* | (2006.01) |
  | *B60R 16/027* | (2006.01) |
  | *B65D 88/02* | (2006.01) |
  | *F25D 11/00* | (2006.01) |
  | *B60R 11/00* | (2006.01) |
  | *B65D 5/49* | (2006.01) |

(52) U.S. Cl.
  CPC .......... *B65D 88/745* (2013.01); *B60R 16/027* (2013.01); *B60R 2011/0036* (2013.01); *B65D 5/48046* (2013.01); *B65D 5/724* (2013.01); *B65D 88/027* (2013.01); *B65D 90/023* (2013.01); *F25D 11/003* (2013.01)

(58) Field of Classification Search
  USPC ................ 296/24.4, 24.41, 186.4, 186.5
  See application file for complete search history.

(56) References Cited

U.S. PATENT DOCUMENTS

| | | | |
|---|---|---|---|
| 4,463,897 A | 8/1984 | Denneny, Jr. | |
| 4,880,342 A | 11/1989 | Pradovic | |
| 5,054,295 A | 10/1991 | Goulooze | |
| 5,129,235 A | 7/1992 | Renken | |
| 5,137,158 A | 8/1992 | Brockway | |
| 5,375,534 A | 12/1994 | Adams | |
| 5,388,939 A | 2/1995 | Barone | |
| 5,423,463 A | 6/1995 | Weeks | |
| 5,704,676 A | 1/1998 | Hill | |
| 5,946,933 A | 9/1999 | Clarke | |
| 6,247,740 B1 * | 6/2001 | Smith | B62D 33/042 |
| | | | 296/181.6 |
| 6,378,319 B1 | 4/2002 | Mani | |
| 6,514,022 B2 * | 2/2003 | Truckor | B60P 7/14 |
| | | | 410/139 |
| 6,543,827 B2 * | 4/2003 | Miller | B60P 3/055 |
| | | | 296/24.35 |
| 6,640,569 B2 | 11/2003 | Goosman | |
| 6,981,828 B2 * | 1/2006 | Davies | B60P 7/135 |
| | | | 410/144 |
| 7,731,255 B2 * | 6/2010 | McJunkin | B60P 7/14 |
| | | | 410/130 |
| 7,785,051 B2 | 8/2010 | Kanczuzewski | |
| 8,172,494 B1 | 5/2012 | Knox | |
| 8,894,122 B2 | 11/2014 | Gilbert | |
| 10,358,173 B2 | 7/2019 | Gussen | |
| 10,946,801 B2 | 3/2021 | Putcha | |
| 2002/0192046 A1 | 12/2002 | Truckor | |
| 2003/0217670 A1 | 11/2003 | Sullivan | |
| 2005/0163584 A1 | 7/2005 | Clark | |
| 2006/0033351 A1 | 2/2006 | Taylor | |
| 2006/0076791 A1 | 4/2006 | Powers, Jr. | |
| 2006/0255609 A1 | 11/2006 | Squyres | |
| 2008/0131226 A1 * | 6/2008 | Pesson | B60P 7/14 |
| | | | 410/129 |
| 2008/0169395 A1 | 7/2008 | Bullock | |
| 2008/0253857 A1 | 10/2008 | Mcjunkin | |
| 2009/0016840 A1 | 1/2009 | Squyres | |
| 2010/0107661 A1 | 5/2010 | Awwad | |
| 2010/0183398 A1 | 7/2010 | Nelson | |
| 2013/0270854 A1 | 10/2013 | Weller | |
| 2015/0338154 A1 | 11/2015 | Senf | |
| 2016/0334142 A1 | 11/2016 | Senf, Jr. | |
| 2018/0009377 A1 | 1/2018 | Troutman | |
| 2018/0368352 A1 | 12/2018 | Smith | |
| 2019/0344719 A1 | 11/2019 | Smith | |
| 2020/0001770 A1 | 1/2020 | Knox | |

OTHER PUBLICATIONS

PCT; App. No. PCT/US2018/039973; International Preliminary Report on Patentability dated Jan. 14, 2020.

USPTO; U.S. Appl. No. 16/021,725; Notice of Allowance dated Nov. 17, 2020.

USPTO; U.S. Appl. No. 16/021,725; Office Action dated Feb. 5, 2020.

USPTO; U.S. Appl. No. 16/021,725; Office Action dated Aug. 5, 2020.

* cited by examiner

ADJUSTABLE TRUCK COMPARTMENT SYSTEM

CROSS-REFERENCE TO RELATED APPLICATIONS

This application is a continuation of U.S. application Ser. No. 16/021,725, filed on Jun. 28, 2018, which claims priority to U.S. Provisional Patent Application No. 62/530,915, filed on Jul. 11, 2017, each of which is incorporated herein by reference in its entirety.

BACKGROUND

Various items are transported between destinations in truck compartments. Items are generally packed next to each other in a single rear compartment without separation between different types of items and/or using fixed storage systems.

SUMMARY

Exemplary embodiments of the present disclosure provide an adjustable truck compartment including rails on the side walls and/or floor/ceiling configured to receive one or more divider panels. Each divider panel can be used to separate the truck compartment into individual adjustable enclosure volumes. Similar types of items or items being delivered to the same destination can therefore be stored in specific enclosure volumes. An exemplary truck can include a volume determination system to assist a user in placement of the divider panels. Based on the dimensions of the items to be stored in an enclosure, one or more volume sensors determine the volume of a specific enclosure and the volume determination system outputs whether and how much placement of the divider panels should be adjusted to accommodate the items without using excess space (e.g., feedback to the user). An exemplary truck can include a temperature control system that regulates the temperature within truck compartment and/or within one or more of the independent enclosure volumes. Frozen or cold items can therefore be maintained at a cooler temperature in one enclosure volume, while an adjacent enclosure volume can be maintained at a different temperature. The exemplary truck compartment further includes an item receiving assembly configured to receive bags of items in a hanging configuration, allowing for a more efficient packing process.

In accordance with embodiments of the present disclosure, an exemplary adjustable truck compartment is provided. The adjustable truck compartment includes a first side wall, a second side wall disposed opposite from the first side wall, a rear wall, and a first divider panel. The first side wall defines a proximal end and a distal end, and includes a first guiding rail extending between the proximal end and the distal end. The second side wall defines a proximal end and a distal end, and includes a second guiding rail extending between the proximal end and the distal end of the second side wall. The rear wall can be coupled to the distal ends of the first and second side walls to define an enclosure between the first side wall, the second side wall, and the rear wall. The first divider panel can be configured to be received by the first and second guiding rails and within the enclosure in an orientation parallel to a floor of the enclosure to separate the enclosure into a first enclosure volume and a second enclosure volume.

In some embodiments, the first and second side walls can include multiple guiding rails extending between the proximal and distal ends, each of the guiding rails separated from each other by a vertical distance. In such embodiments, the truck compartment can include multiple divider panels configured to be received by the respective multiple guiding rails in an orientation parallel to horizontal to separate the enclosure into multiple enclosures volumes.

The truck compartment includes a ceiling at an opposing side from the floor. The ceiling and floor can be coupled to top and bottom ends of the first and second side walls, respectively. The ceiling and floor can each define a proximal end and a distal end. In some embodiments, the ceiling and floor can each include guiding rails extending between the proximal end and the distal end. In such embodiments, the truck compartment can include a second divider panel configured to be received by the guiding rails of the ceiling and floor in an orientation perpendicular to the floor to separate the enclosure into individual enclosures volumes. In some embodiments, the same divider panel can be used for either the guiding rails on the side walls or the guiding rails on the floor and ceiling.

In some embodiments, the first divider panel can include guiding rails on opposing sides of the first divider panel. In some embodiments, the second divider panel can be configured to be received by the guiding rail of the ceiling or floor and the guiding rail of the first divider panel to separate the first or second enclosure volumes into additional enclosure volumes.

The truck compartment can include a temperature control system configured to regulate a temperature within the enclosure. The temperature control system can include one or more sensors configured to detect the temperature within the enclosure. In some embodiments, upon separation of the enclosure into the first and second enclosure volumes, the one or more sensors can be configured to automatically (or substantially automatically) detect the temperature within the first and second enclosure volumes and the temperature control system can be configured to automatically (or substantially automatically) and independently regulate the temperature within the first and second enclosure volumes.

Temperature regulation within the individual enclosures can therefore be regulated automatically and substantially in real-time based on divisions of the main enclosure. The temperature control system can regulate the temperature within the first and second enclosure volumes such that the temperature within the first enclosure volume is different from the temperature within the second enclosure volume. In some embodiments, the temperature control system can regulate the temperature within the first and second enclosure volumes such that the temperature within the first and second enclosure volumes is substantially equal.

In some embodiments, the truck compartment can include an item receiving assembly extending from the first side wall and the second side wall. The item receiving assembly can include a plurality of hooks each configured to receive a bag in a hanging configuration.

In some embodiments, the system can include a plurality of volume sensors (e.g., sensors configured to measure space in three dimensions) disposed within the truck compartment and configured to detect a volume of the first and second enclosure volumes. The system can include a volume determination system configured to receive as input data representative of a desired volume of at least one of the first and second enclosure volumes, and determine whether the detected volume of at least one of the first and second enclosure volumes is equal to or greater than the desired volume. If the detected volume of the first and second enclosure volumes is determined to be less than the desired volume, the volume determination system can output a new position of the first divider panel to achieve the desired volume in at least one of the first and second enclosure volumes. The volume determination system thereby provides feedback and user assist to ensure the divider panels are placed in the proper position to achieve the desired individual enclosures without excess unused space.

In accordance with embodiments of the present disclosure, an adjustable truck compartment system is provided. The system includes a first side wall, a second side wall, a rear wall, a first divider panel, and a temperature control system. The first side wall defines a proximal end and a distal end, and includes a first guiding rail extending between the proximal end and the distal end. The second side wall can be opposite from the first side wall, defines a proximal end and a distal end, and includes a second guiding rail extending between the proximal end and the distal end of the second side wall. The rear wall can be coupled to the distal end of the first and second side walls to define an enclosure between the first side wall, the second side wall, and the rear wall. The first divider panel can be configured to be received by the first and second guiding rails and within the enclosure in an orientation parallel to a floor of the enclosure to separate the enclosure into a first enclosure volume and a second enclosure volume. The temperature control system can include one or more sensors configured to detect a temperature within the enclosure. Upon separation of the enclosure into the first and second enclosure volumes, the one or more sensors can be configured to automatically (or substantially automatically) detect the temperature within the first and second enclosure volumes and the temperature control system can be configured to automatically (or substantially automatically) and independently regulate the temperature within the first and second enclosure volumes.

In some embodiments, the system can include a processing device configured to receive signals transmitted from the one or more sensors corresponding to the detected temperature within the first and second enclosure volumes. The processing device can be configured to regulate the temperature control system based on the received signals from the one or more sensors to automatically (or substantially automatically) and independently regulate the temperature within the first and second enclosure volumes.

In accordance with embodiments of the present disclosure, and exemplary method of adjusting a truck compartment is provided. The method includes providing an adjustable truck compartment. The truck compartment includes a first side wall, a second side wall, a rear wall, a first divider panel, and a temperature control system. The first side wall defines a proximal end and a distal end, and includes a first guiding rail extending between the proximal end and the distal end. The second side wall can be disposed opposite from the first side wall, defines a proximal end and a distal end, and includes a second guiding rail extending between the proximal end and the distal end of the second side wall. The rear wall can be coupled to the distal end of the first and second side walls to define an enclosure between the first side wall, the second side wall, and the rear wall. The temperature control system can include one or more sensors. The method includes separating the enclosure into a first enclosure volume and a second enclosure volume by introducing the first divider panel into the first and second guiding rails in an orientation parallel to a floor of the enclosure. The method includes detecting a temperature within the first and second enclosure volumes with the one or more sensors. The method includes automatically (or substantially automatically) and independently regulating the temperature within the first and second enclosure volumes with the temperature control system.

In some embodiments, the method can include separating the first or second enclosure volume into additional enclosure volumes with a second divider panel. In such embodiments, the method can include automatically (or substantially automatically) and independently regulating the temperature within the first and second enclosure volumes such that the temperature within the first enclosure volume is different from the temperature within the second enclosure volume.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the adjustable truck compartment, reference is made to the accompanying figures, wherein.

DETAILED DESCRIPTION

Exemplary embodiments of the present disclosure provide an adjustable truck compartment system including rails on the side walls and/or floor/ceiling configured to receive one or more divider panels. Each divider panel can be used to separate the enclosure within the truck compartment into individual enclosure volumes (e.g., via horizontal and/or vertical separation). The truck compartment can therefore be customized to accommodate and store a variety of items. The exemplary truck compartment includes a temperature control system that regulates the temperature within each of the independent enclosure volumes. The temperature control system can substantially automatically adjust the temperature of the individual compartments upon placement of the divider panel into the rails. Frozen or cold items can therefore be maintained at a cooler temperature in one enclosure volume, while the adjacent enclosure volume can be maintained at a different temperature and/or can have an unregulated temperature. The exemplary truck compartment further includes an item receiving assembly configured to receive bags of items in a hanging configuration, allowing for a more efficient packing process.

Figure 1:
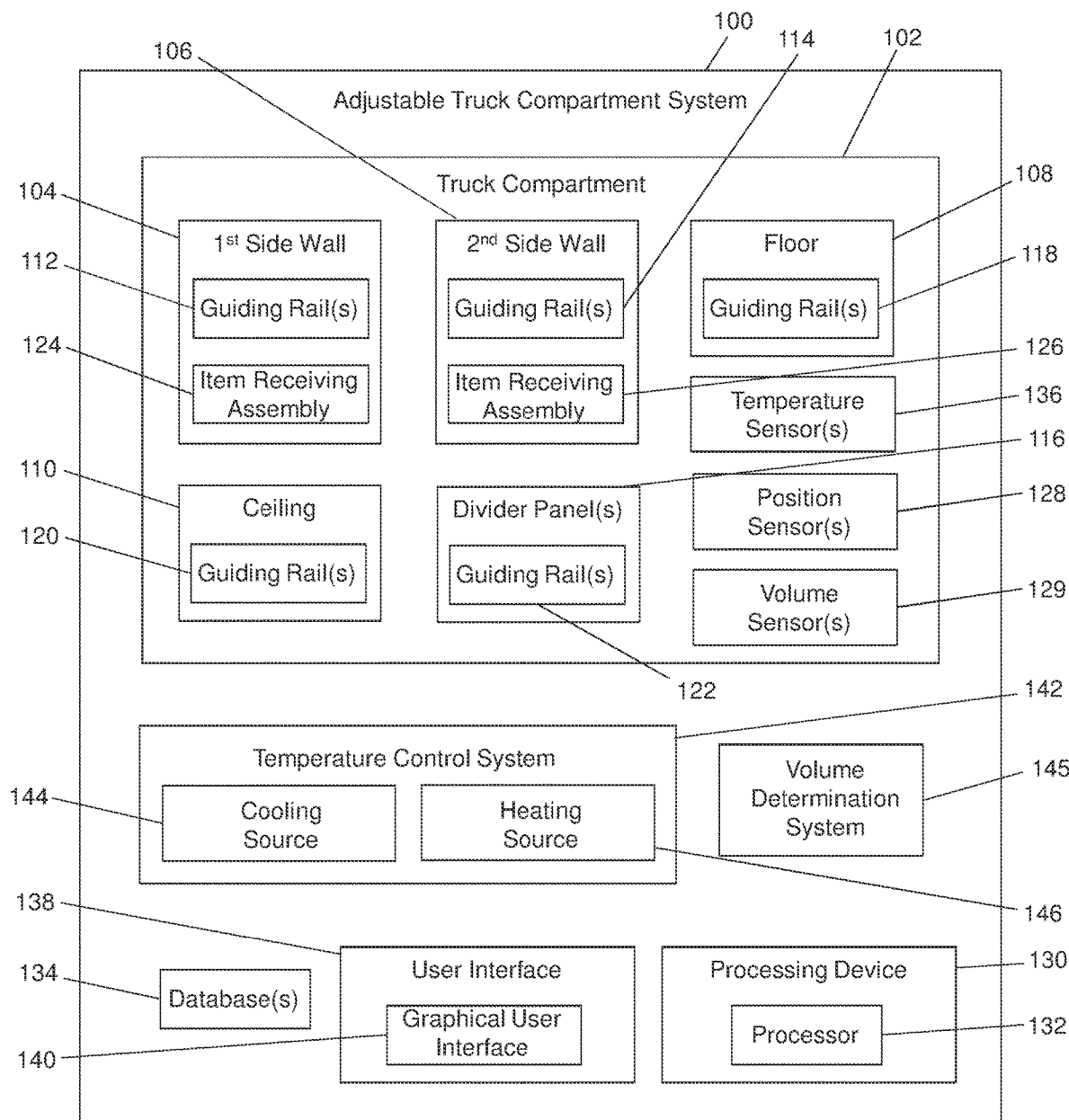
FIG. 1 is a block diagram of an exemplary adjustable truck compartment system of the present disclosure.

FIG. 1 is a block diagram of an exemplary adjustable truck compartment system 100 (hereinafter "system 100") of the present disclosure. The system 100 includes a truck compartment 102 configured to be customized for holding a variety of items. Although discussed herein as implemented for a truck, it should be understood that the exemplary system 100 could be incorporated into any type of storage and/or transport system. The compartment 102 generally includes first and second side walls 104, 106 disposed on opposing sides, a floor 108 connected to the bottom edges of the first and second side walls 104, 106, and a ceiling 110 connected to the top edges of the first and second side walls 104, 106 at an opposing side from the floor 108. The side walls 104, 106, floor 108 and ceiling 110 define an enclosure configured to receive items. The truck compartment 102 generally includes a door configured to close the enclosure during transport of the items.

Each of the side walls 104, 106 includes one or more guiding rails 112, 114 mounted to the inner, enclosure-facing surfaces of the walls 104, 106. The guiding rails 112, 114 can be aligned along the same plane substantially parallel to horizontal (e.g., the same height from the floor 108) on opposing sides of the enclosure. The guiding rails 112, 114 are configured to receive a divider panel 116 to separate the enclosure into individual enclosure volumes that are dimensioned smaller than the main enclosure. For example, a divider panel 116 can be inserted through the guiding rails 112, 114 substantially parallel to horizontal to separate the main enclosure into a first top enclosure and a second top enclosure. In some embodiments, each of the side walls 104, 106 can include multiple guiding rails 112, 114 spaced from each other by a vertical distance such that two or more individual enclosures can be formed (e.g., enclosures of the equal sizes, enclosures of different sizes, or the like).

The floor 108 and ceiling 110 also include one or more guiding rails 118, 120 mounted to the inner, enclosure-facing surfaces. The guiding rails 118, 120 can be aligned along the same plane substantially perpendicular to horizontal (e.g., the same distance from the side walls 104, 106) on opposing sides of the enclosure. The guiding rails 118, 120 are configured to receive a divider panel 116 to separate the enclosure into individual enclosure volumes that are dimensioned smaller than the main enclosure. For example, the divider panel 116 can be inserted through the guiding rails 118, 120 substantially perpendicular to horizontal to separate the main enclosure into a first side enclosure and a second side enclosure. In some embodiments, the floor 108 and ceiling 110 can include multiple guiding rails 118, 120 spaced from each other by a horizontal distance such that two or more individual enclosures can be formed (e.g., enclosures of equal sizes, enclosures of different sizes, or the like).

In some embodiments, each divider panel 116 can include a joint extending substantially through a central section of the divider panel 116, allowing the divider panel 116 to either be folded into a smaller overall width or individual panels to be detached from each other into divider panels having a smaller overall width. In some embodiments, the divider panels 116 can be provided in a variety of sizes. In some embodiments, each divider panel 116 can include guiding rails 122 mounted on opposing sides of the divider panel 116. Thus, a full size divider panel 116 can be introduced into the guiding rails 112, 114 of the side walls 104, 106 to form top and bottom individual enclosure volumes, and another divider panel 116 can be introduced into the guiding rails 118, 122 and/or the guiding rails 120, 122 to further separate the top and bottom individual enclosure volumes into smaller enclosure volumes. The divider panels 116 can therefore be used to customize the individual enclosure volumes based on the items being transported.

In some embodiments, each of the divider panels 116 can include an engagement mechanism configured to secure the divider panel 116 to the guiding rails 112, 114, 118, 120, thereby preventing undesired movement of the divider panel 116. In some embodiments, the engagement mechanism can be on the guiding rails 112, 114, 118, 120. In some embodiments, the edges of each divider panel 116 can include padding or insulation to ensure separation between each of the individual enclosure volumes.

In some embodiments, the first and second side walls 104, 106 can each include item receiving assemblies 124, 126 coupled to the inner, enclosure-facing walls. Each item receiving assembly 124, 126 can include hooks configured to receive bags holding items in a hanging orientation. Thus, rather than being limited to placing items on the floor 108, the truck compartment 102 can receive items on the floor 108 and/or on the item receiving assembly 124, 126, providing for a greater capacity for items while ensuring that items are not damaged during transport. In some embodiments, the divider panels 116 and/or ceiling 110 can include similar item receiving assemblies.

In some embodiments, the truck compartment 102 can include position sensors 128 disposed within the enclosure (e.g., adjacent to the guiding rails 112, 114, 118, 120, 122). The position sensors 128 can be configured to detect when a divider panel 116 has been inserted into the respective guiding rails 112, 114, 118, 120, 122, and can transmit data representing the detected divider panel 116 to a processing device 130 (e.g., including a processor 132). The position sensors 128 can include, for example, optical sensors (e.g., transmissive or reflective infrared sensors), acoustic sensors, and/or proximity sensors). The data transmitted by the position sensors 128 can be electronically stored in one or more databases 134.

In some embodiments, the truck compartment 102 can include temperature sensors 136 configured to detect the temperature within the main enclosure and each of the individual enclosure volumes. For example, the truck compartment 102 can include a temperature sensor 136 for each area that can potentially be separated into an individual enclosure volume, thereby ensuring that each individual enclosure volume includes at least one temperature sensor 136. Upon detecting the placement of a divider panel 116 via the position sensors 128, the temperature sensors 136 can detect and transmit data representative of the temperature in each of the individual enclosure volumes to the processing device 130.

In some embodiments, the system 100 can include a user interface 138 (e.g., including a graphical user interface (GUI) 140) for outputting the temperature conditions within the individual enclosure volumes and receiving input for regulating such temperature conditions. The system 100 can include a temperature control system 142 including a cooling source 144 and a heating source 146. The temperature control system 142 can be programmed via the user interface 138 to control the temperature within each of the individual enclosure volumes. Thus, one enclosure volume can have a temperature that is different from an adjacent enclosure volume. Based on the detected temperature transmitted from the temperature sensors 136, the processing device 130 can control the temperature control system 142 to maintain the desired temperature within one or more the individual enclosure volumes. In some embodiments, the temperature within one or more of the individual enclosures volumes can be unregulated.

In some embodiments, the system 100 can include a volume determination system 145 that includes volume sensors 129 having a source, a detector, a one or more processor and memory. The volume sensors 129 can be optical sensors configured to measure distances in three-dimensional space (e.g., along three perpendicular axes). The volume sensors 129 can be optical sensors where the source is a light source and the detectors are light detectors (infrared light source and detector) and/or can be acoustic sensors where the source is an acoustic radiation source and the detector is an acoustic transducer. The volume determination system 145 can assist the user in placement of the divider panels 116 to achieve the desired volume capable of accommodating specific items. The volume determination system 145 can provide feedback to the user regarding the individual enclosure volumes, indicating whether the position of the divider panels 116 should be adjusted based on the desire to insert items having specific dimensions. The truck compartment 102 can include one or more of volume sensors 129 distributed within the enclosure. The volume sensors 129 can be communicatively connected to each other such that one or more of the sensors 129 can determine the dimensions and/or volume of all or a specific enclosure volume. The volume sensors 129 can each be communicatively connected to the processing device 130 and/or the user interface 138.

In some embodiments, a user can input via the user interface 138 the items to be inserted into the enclosure of the truck compartment 102. In some embodiments, the dimensions of the items to be inserted can be automatically obtained by the system 100 from the database 134 storing information regarding each of the items. In some embodiments, the dimensions of the items can be inserted by the user via the user interface 138. Data received from the volume sensors 129 by the volume determination system 145 can be used to output whether the current configuration of the individual enclosures is capable of accommodating the items to be inserted or whether one or more of the divider panels 116 should be repositioned to increase or decrease one or more of the individual enclosures.

For example, if the items to be inserted are determined to have a volume of 100 ft$^3$ with a height of 5 ft, a width of 2 ft, and a length of 10 ft, data from the volume sensors 129 can indicate that the volume of an individual enclosure in the current configuration is currently capable of accommodating only 80 ft$^2$. The volume determination system 145 can output the exact location into which one or more of the divider panels 116 should be placed to accommodate the volume and/or dimensions of the items to be inserted. The feedback and user assist provided by the volume determination system 145 ensures that the individual enclosures created with the divider panels 116 are optimized to fit the desired items without excessive unused space.

Figure 2:
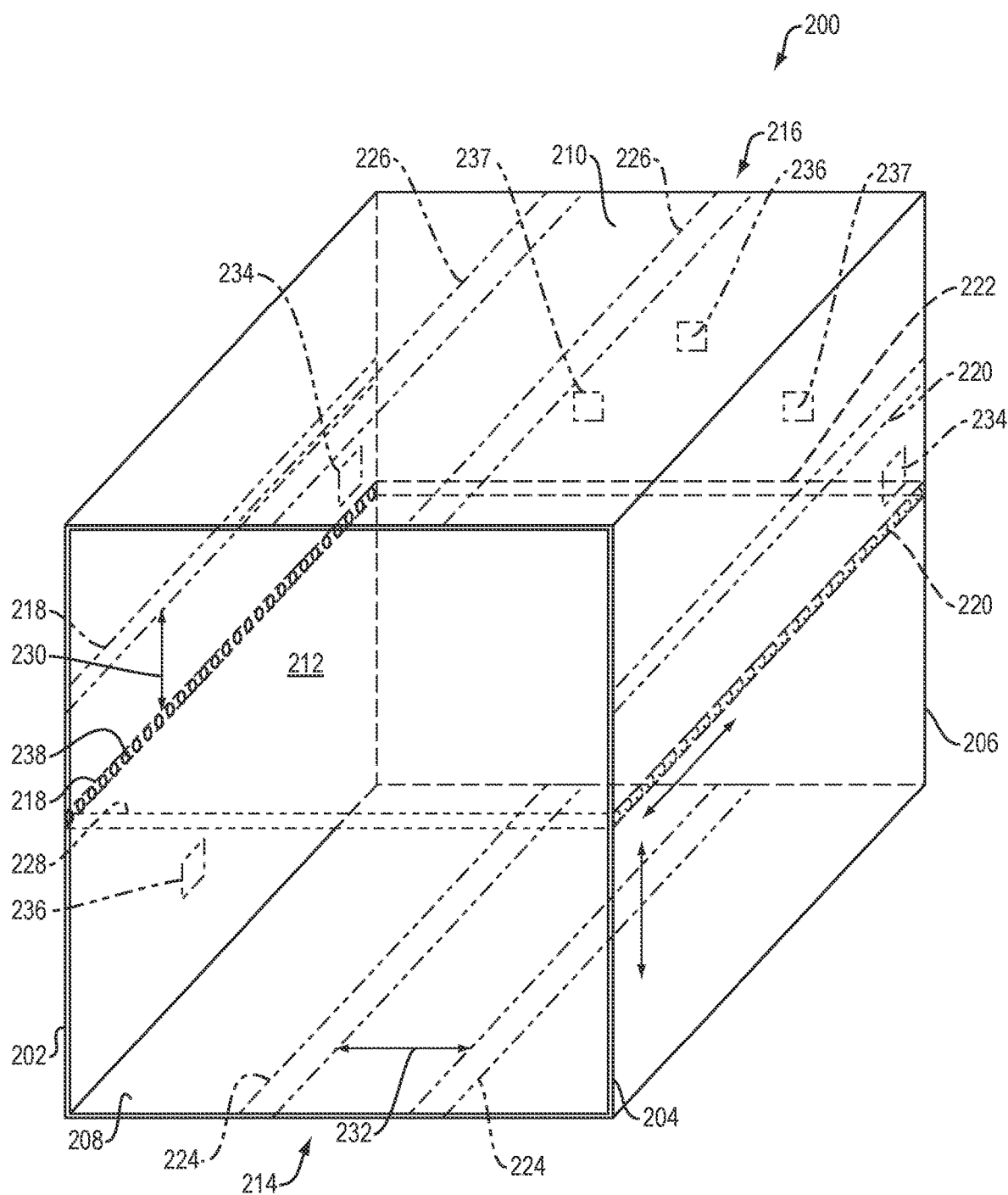
FIG. 2 is a diagrammatic view of an exemplary adjustable truck compartment of the present disclosure.

FIG. 2 is a diagrammatic view of an exemplary adjustable truck compartment 200 of the present disclosure. The compartment 200 includes a first side wall 202, a second side wall 204, a rear wall 206 coupled to the side walls 202, 204, a floor 208, and a ceiling 210. The walls define an enclosure 212 configured to receive items for storage and/or transport. The opening opposite from the rear wall 206 can be closed by doors (not shown). The compartment 200 generally defines a proximal end 214 at the opening to the enclosure 212 and a distal end 216 at the rear wall 206.

The first and second side walls 202, 204 each include guiding rails 218, 220 extending between the proximal and distal ends 214, 216 (e.g., substantially parallel to horizontal or the floor 208). In some embodiments, the rear wall 206 can include a guiding rail 222 connected to the guiding rails 218, 220. The floor 208 and ceiling 210 each include guiding rails 224, 226 extending between the proximal and distal ends 214, 216 (e.g., substantially parallel to horizontal or the floor 208). Each of the guiding rails 218-226 can be configured to slidably receive therein a divider panel 228 (shown in dashed lines) to separate or partition the enclosure 212 into individual enclosure volumes. The individual guiding rails 218-226 can be separated from adjacently positioned guiding rails 218-226 by vertical distances 230 horizontal distances 232. Although two guiding rails 218-226 are shown, it should be understood that the compartment 200 can include any number of guiding rails 218-226 to allow for customization of the enclosure 212.

As an example, a divider panel 228 can be inserted through the guiding rails 218, 220 (e.g., substantially parallel to the floor 208) to separate the enclosure 212 into a top and bottom individual enclosure volume. As a further example, a divider panel 228 can be inserted through the guiding rails 224, 226 (e.g., substantially perpendicular to the floor 208) to separate the enclosure 212 into left and right side individual enclosure volumes. As a further example, multiple divider panels 228 can be inserted through the guiding rails 218-226 to separate the enclosure 212 into two or more individual enclosure volumes.

In some embodiments, the guiding rails 218-226 can each include bearings or rollers 238 configured to provide for smoother insertion and removal of the divider panel 228. In some embodiments, the compartment 200 can include position sensors 234 disposed within the enclosure 212. In some embodiments, the position sensors 234 can be disposed adjacent to or within the guiding rails 218-226. The position sensors 234 can be configured to detect when a divider panel 228 has been inserted into the respective guiding rails 218-226. In some embodiments, the compartment 200 can include temperature sensors 236 mounted around the enclosure 212 configured to detect the temperature within the enclosure 212 and/or the individual enclosure volumes. In some embodiments, the compartment 200 can include one or more volume sensors 237 distributed within the enclosure 212 configured to detect the dimensions and/or volume of the individual enclosures created with the divider panels 228, such data implemented by the volume determination system to assist the user in placement of the divider panels 228 to accommodate the desired items to be transported.

Figure 3:
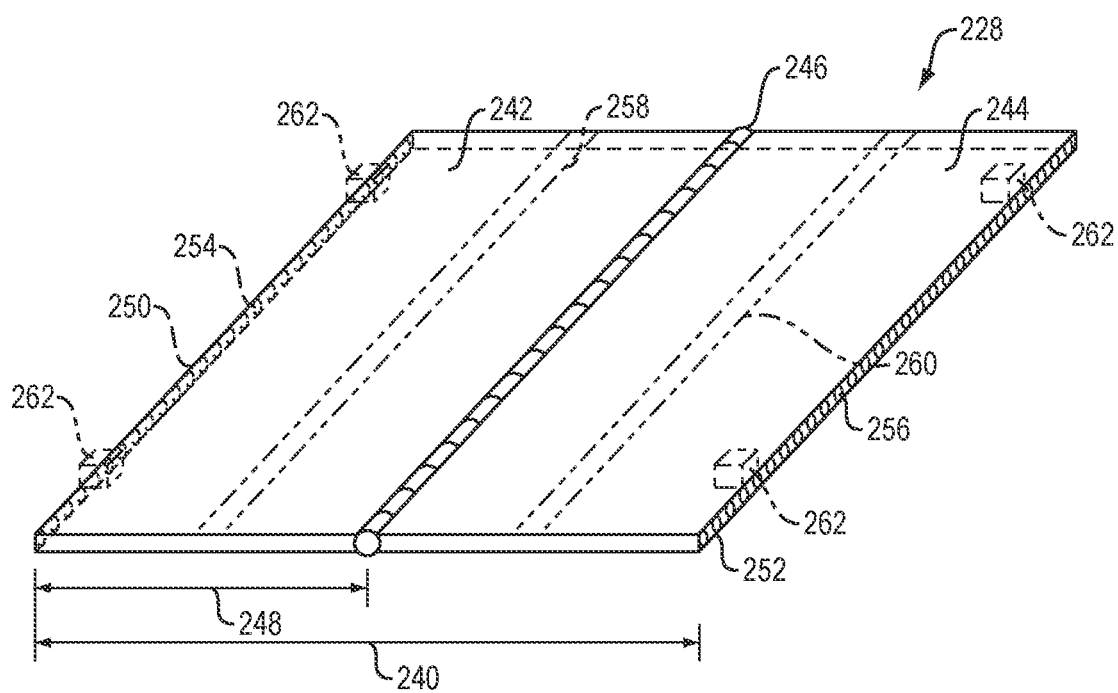
FIG. 3 is a diagrammatic view of an exemplary divider panel in accordance with exemplary embodiments of the present disclosure.

FIG. 3 is a diagrammatic view of an exemplary divider panel 228 of the present disclosure. In some embodiments, the divider panel 228 can include a solid body defining a width 240. In some embodiments, the divider panel 228 can include two or more individual panels 242, 244 coupled at a hinge or coupling mechanism 246. Each of the individual panels 242, 244 can define a width 248 dimensioned smaller than the width 240. The coupling mechanism 246 can be used to separate the divider panel 228 into smaller panels 242, 244 depending on whether the divider panel 228 will extend across the entire enclosure 212 or only a portion of the enclosure 212 (e.g., between a wall of the compartment 200 and another divider panel 228).

Each divider panel 228 can include side edges 250, 252 configured to be inserted into the guiding rails 218-226. In some embodiments, the side edges 250, 252 can include bearings or rollers 254, 256 configured to provide for smoother insertion and removal of the divider panel 228 from the guiding rails 218-226. Each divider panel 228 can include one or more guiding rails 258, 260 on one or more sides of the divider panel 228, the guiding rails 258, 260 configured to receive an edge 250, 252 of another divider panel 228. For example, if a divider panel 228 is inserted into the guiding rails 218, 220 such that the divider panel 228 extends substantially parallel to the floor 208, an individual panel 242 of the divider panel 228 can be inserted into the guiding rails 224, 258 to separate the bottom individual enclosure volume into additional enclosure volumes. The divider panels 228 can therefore be received by the guiding rails 218-226 of the enclosure 212 walls, and by the guiding rails 258, 260 of other divider panels 228.

In some embodiments, each divider panel 228 can include an engagement mechanism 262 configured to engage the walls of the enclosure 212, other divider panels 228, and/or the guiding rails 218-226, to prevent undesired movement of the divider panel 228 from the guiding rails 218, 226. Thus, once positioned, in the divider panel 228 can be locked in place until a change in the customized enclosure volume is desired. In some embodiments, rather than or in addition to being disposed on the divider panel 228, the enclosure 212 can include engagement mechanisms 262 for locking the divider panels 228 in place.

Figure 4:
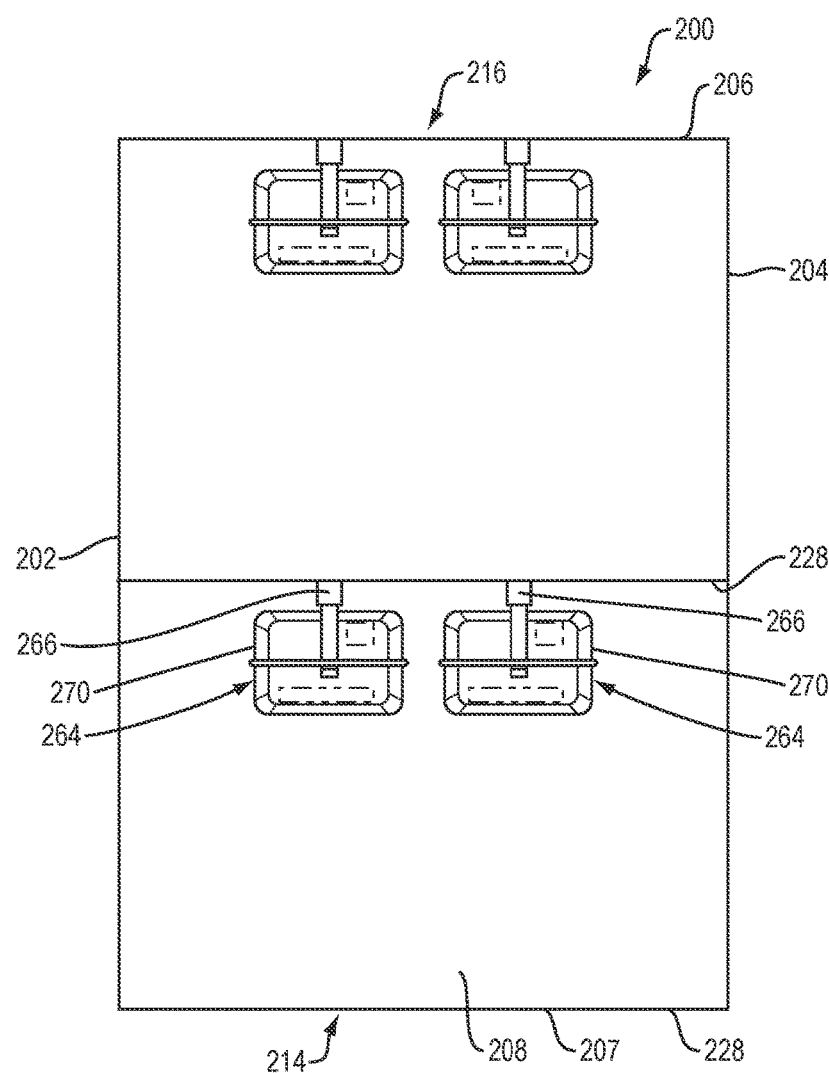
FIG. 4 is diagrammatic top view of an exemplary adjustable truck compartment including an item receiving assembly in accordance with embodiments of the present disclosure.
Figure 5:
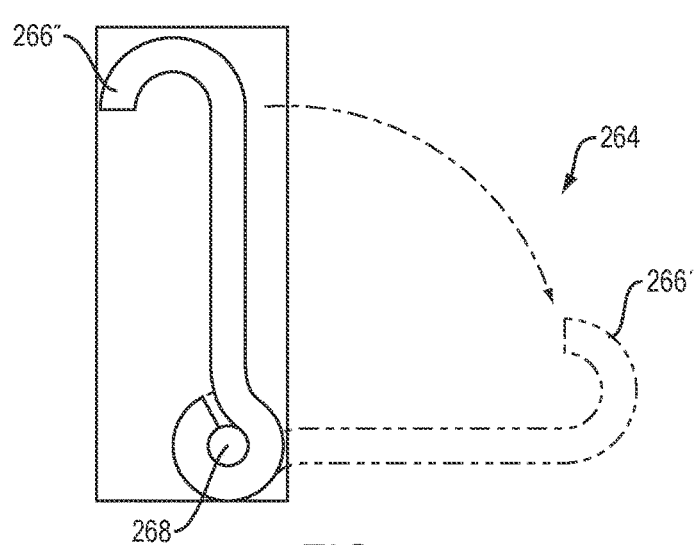
FIG. 5 is a diagrammatic detailed view of an exemplary item receiving assembly in accordance with embodiments of the present disclosure.

FIGS. 4 and 5 show diagrammatic views of the compartment 200 including exemplary item receiving assemblies 264. In FIG. 4, wall 207 represents one or more doors of the enclosure 212. Each item receiving assembly 264 can include a support structure 266 (e.g., a hook) configured to be mounted to the walls and/or the divider panel 228. Each support structure 266 is configured to be positioned in an extended position or a retracted position. For example, FIG. 5 shows the structure 266 in the extended position 266' and the retracted position 266".

The structure 266 can include a pivot joint 268 allowing the structure to be placed in the retracted position for storage, and in the extended position for use. In the extended position, the structure 266 can be configured to support one or more bags 270 holding items. Thus, the items can be maintained in a hanging configuration within the enclosure 212, allowing for store of items on the floor 208 and additional items on the item receiving assemblies 264.

Figure 6:
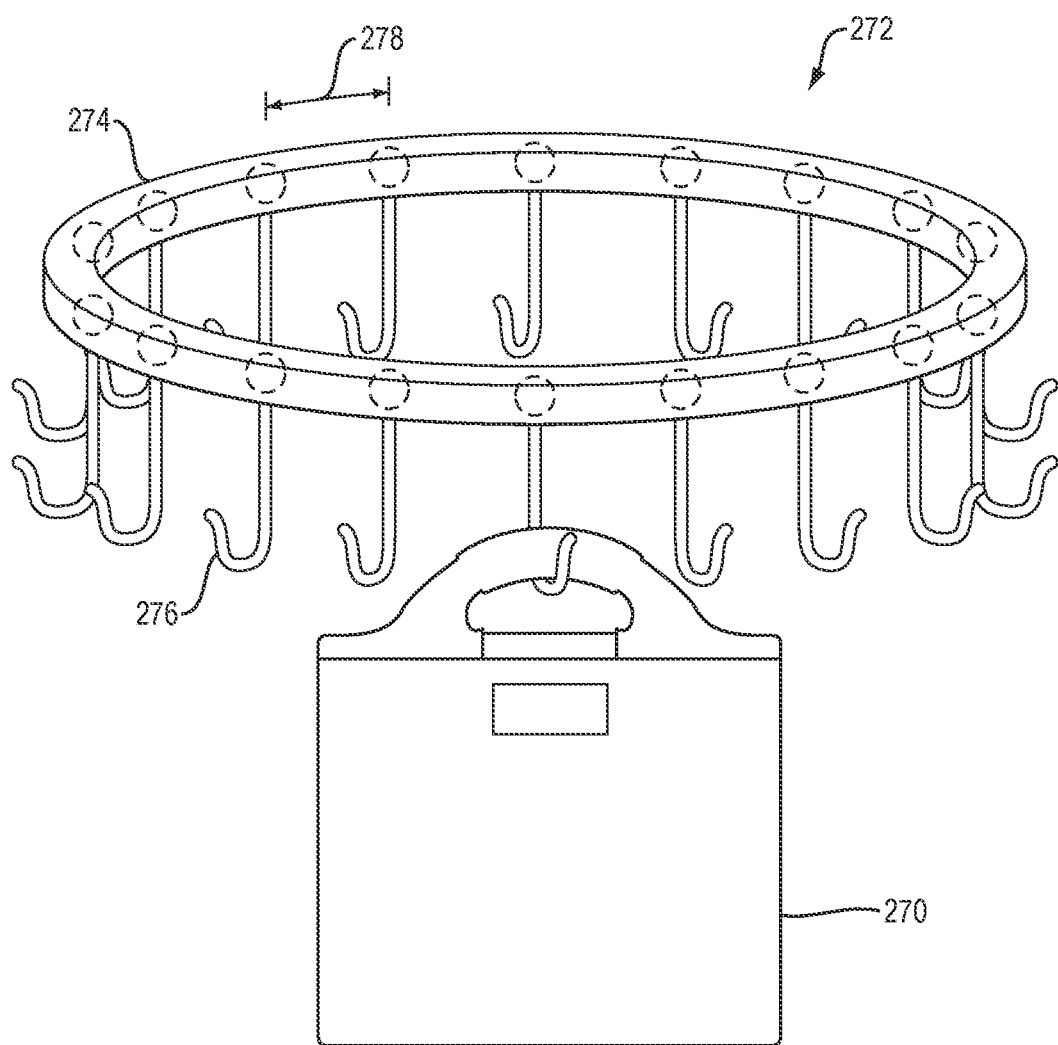
FIG. 6 is a diagrammatic perspective view of an exemplary item receiving assembly in accordance with embodiments of the present disclosure.
Figures 7, 8:
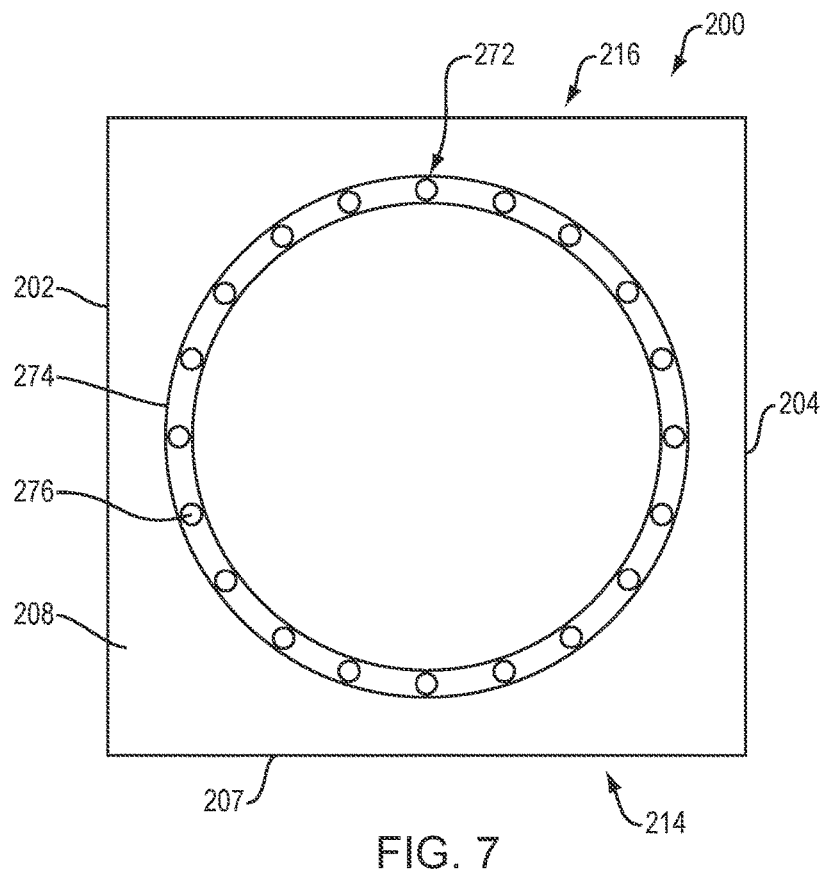
FIG. 7 is a diagrammatic top view of an exemplary item receiving assembly in accordance with embodiments of the present disclosure.
FIG. 8 is a diagrammatic view of an exemplary item receiving assembly in accordance with embodiments of the present disclosure.

FIGS. 6 and 7 show diagrammatic views of an exemplary item receiving assembly 272 of the present disclosure. The item receiving assembly 272 can include a substantially circular track 274 including support structures 276 mounted to the track 274 and spaced from each other by radial distances 278. Each support structure 276 can be configured to receive one or more bags 270 for supporting items in a hanging configuration.

FIG. 8 is a diagrammatic view of an exemplary item receiving assembly 280 mounted within the compartment 200. The item receiving assembly 280 can include a substantially circular track 282 and support structures (not shown) mounted to the track 282. In some embodiments, the item receiving assembly 280 can be coupled to one of the walls of the compartment 200 by a mounting flange 284. In some embodiments, the item receiving assembly 280 can be rotatably coupled to the mounted flange 284 at a joint 286 such that the track 282 can be rotated at the joint 286 for ease of access of the items hanging on the support structures of the item receiving assembly 280.

Figure 9:
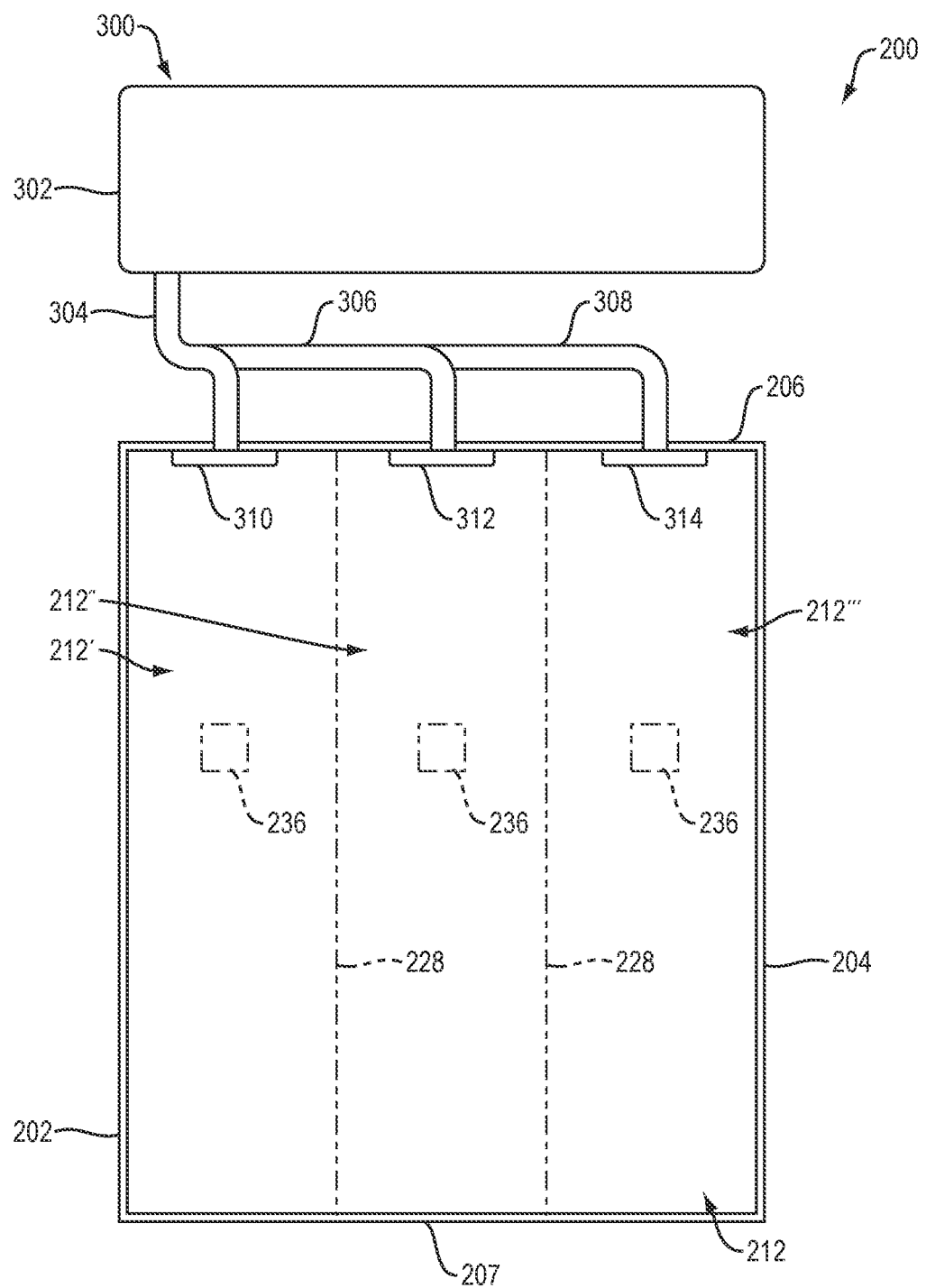
FIG. 9 is a diagrammatic perspective view of an exemplary adjustable truck compartment including a temperature control system in accordance with embodiments of the present disclosure.

FIG. 9 is a diagrammatic view of an adjustable truck compartment 200 including an exemplary temperature control system 300 for regulating the temperature within the enclosure 212. As an example, the compartment 200 includes two divider panels 228 separating the enclosure 212 into a first individual enclosure volume 212', a second individual enclosure volume 212", and a third individual enclosure volume 212''' extending the length of the enclosure 212. However, it should be understood that the enclosure 212 can include additional divider panels 228 extending perpendicularly to the shown divider panels 228, thereby partitioning the enclosure 212 into additional enclosure volumes. The divider panels 228 can maintain a seal between the enclosure volumes 212', 212", 212''' such that items having different characteristics can be separated from each other.

The temperature control system 300 can include cooling and/or heating source 302 and ducts 304-308 connecting the cooling and/or heating source 302 with respective outlets 310-314 at each of the enclosure volumes 212', 212", 212'''. Depending on the desired temperature in each of the enclosure volumes 212', 212", 212''', the temperature control system 300 can introduce the appropriate temperature of air into the enclosure volumes 212', 212", 212'''. Thus, the temperature within the enclosure volumes 212', 212", 212''' can be different or substantially similar.

The temperature control system 300 can be in communication with the temperature sensors 236 disposed in each of the enclosure volumes 212', 212", 212''' (e.g., directly or via a processing device) such that the desired temperature can be maintained in the enclosure volumes 212', 212", 212'''. Accordingly, the temperature within the enclosure volumes 212', 212", 212''' can be customized and regulated based on the needs of the user.

In some embodiments, the temperature control system 300 can vary the temperature within each of the enclosure volumes 212', 212", 212''' based on detection of the position of the divider panels 228. For example, if the divider panel 228 is positioned to form the enclosure volumes 212', 212", the temperature control system 300 can automatically adjust the temperature within each of the respective enclosure volumes 212', 212". Thus, the temperature control system 300 can react and adjusts the temperature within the enclosure volumes 212', 212", 212''' automatically based on detection of placement of the divider panels 228.

Figure 10:
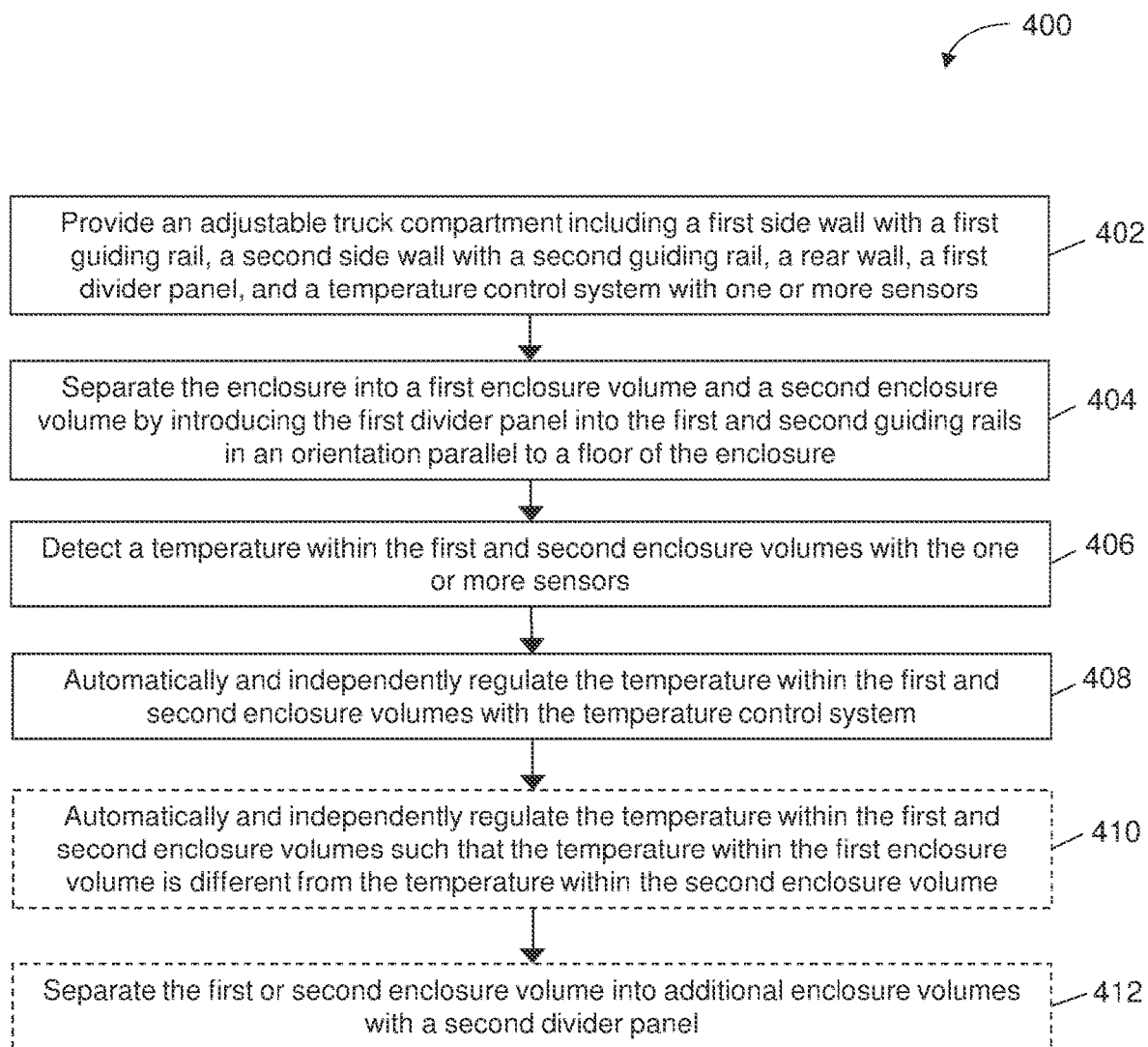
FIG. 10 is a flowchart illustrating a process of implementing an exemplary adjustable truck compartment in accordance with embodiments of the present disclosure.

FIG. 10 is a flowchart illustrating an exemplary process 400 of implementing the adjustable truck compartment described herein. To begin, at step 402, an adjustable truck compartment including a first side wall with a first guiding rail, a second side wall with a second guiding rail, a rear wall, a first divider panel, and a temperature control system with one or more sensors, is provided. At step 404, the enclosure can be separated into a first enclosure volume and a second enclosure volume by introducing the first divider panel into the first and second guiding rails in an orientation parallel to a floor of the enclosure. At step 406, a temperature within the first and second enclosure volumes can be detected with the one or more sensors.

At step 408, the temperature within the first and second enclosure volumes can be automatically and independently regulated with the temperature control system. In some embodiments, at step 410, the temperature within the first and second enclosure volumes can be regulated such that the temperature within the first enclosure volume is different from the temperature within the second enclosure volume. At step 412, the first or second enclosure volumes can be separated into additional enclosure volumes with a second divider panel. In embodiments, the temperature within the first and second enclosure volumes and the temperature within the additional enclosure volumes can be automatically and independently regulated and/or the temperature of one of the first and second enclosure volumes can be unregulated.

Thus, the exemplary truck compartment provides an efficient and flexible manner in which the enclosure can be customized for transport of specific items. In particular, divider panels can be used to customize the enclosure into independent enclosure volumes of different sizes to accommodate a variety of items. Item receiving assemblies can be used to accommodate a greater number of items in the enclosure volumes, with some items being stored on the floor while other items are stored in a hanging configuration. The temperature control system advantageously allows for independent and automatic regulation of the temperature within each of the enclosure volumes, thereby allowing for different items to be transported in a single vehicle. The compartment can also be reduced in size if a low amount of inventory is being transported, thereby reducing costs of operation.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. An adjustable truck compartment, comprising:
   a first side wall defining a proximal end and a distal end, the first side wall including a first guiding rail extending between the proximal end and the distal end;
   a second side wall disposed opposite from the first side wall, the second side wall defining a proximal end and a distal end, the second side wall including a second guiding rail extending between the proximal end and the distal end of the second side wall;
   a rear wall coupled to the distal ends of the first and second side walls to define an enclosure between the first side wall, the second side wall, and the rear wall; and
   a first divider panel configured to be received by the first and second guiding rails and within the enclosure in an orientation parallel to a floor of the enclosure to separate the enclosure into a first enclosure volume and a second enclosure volume;
   wherein:
      the first divider panel includes one or more guiding rails on one or more sides of the first divider panel;
      the adjustable truck compartment comprises a temperature control system including one or more sensors configured to detect a temperature within the enclosure and, upon separation of the enclosure into the first and second enclosure volumes, the one or more sensors are configured to automatically detect the temperature within the first and second enclosure volumes and the temperature control system is configured to automatically and independently regulate the temperature within the first and second enclosure volumes; and
      the adjustable truck compartment comprises one or more volume sensors configured to detect a volume of the first and second enclosure volumes.

2. The adjustable truck compartment of claim 1, wherein the first and second side walls comprise multiple guiding rails extending between the proximal and distal ends, each of the guiding rails separated from each other by a vertical distance.

3. The adjustable truck compartment of claim 2, comprising multiple divider panels configured to be received by the multiple guiding rails in an orientation parallel to horizontal to separate the enclosure into multiple enclosures volumes.

4. The adjustable truck compartment of claim 1, comprising a ceiling, wherein the ceiling and floor are coupled to top and bottom ends of the first and second side walls, the ceiling and floor defining a proximal end and a distal end.

5. The adjustable truck compartment of claim 4, wherein the ceiling and floor each include guiding rails extending between the proximal end and the distal end.

6. The adjustable truck compartment of claim 5, comprising a second divider panel configured to be received by the guiding rails of the ceiling and floor in an orientation perpendicular to the floor to separate the enclosure into individual enclosures volumes.

7. An adjustable truck compartment, comprising:
   a first side wall defining a proximal end and a distal end, the first side wall including a first guiding rail extending between the proximal end and the distal end;
   a second side wall disposed opposite from the first side wall, the second side wall defining a proximal end and a distal end, the second side wall including a second guiding rail extending between the proximal end and the distal end of the second side wall;
   a rear wall coupled to the distal ends of the first and second side walls to define an enclosure between the first side wall, the second side wall, and the rear wall; and
   a first divider panel configured to be received by the first and second guiding rails and within the enclosure in an orientation parallel to a floor of the enclosure to separate the enclosure into a first enclosure volume and a second enclosure volume;
   wherein:
      the first divider panel includes one or more guiding rails on one or more sides of the first divider panel;
      the adjustable truck compartment comprises a temperature control system including one or more sensors configured to detect a temperature within the enclosure;
      the adjustable truck compartment comprises one or more volume sensors configured to detect a volume of the first and second enclosure volumes;
      the adjustable truck compartment comprises a second divider panel, and
      the one or more guiding rails on one or more sides of the first divider panel include guiding rails on opposing sides of the first divider panel.

8. The adjustable truck compartment of claim 7, further comprising a ceiling, wherein the ceiling and floor are coupled to top and bottom ends of the first and second side walls, the ceiling and floor defining a proximal end and a distal end;

wherein the ceiling and floor each include guiding rails extending between the proximal end and the distal end; and wherein the second divider panel is configured to be received by a guiding rail of the ceiling or floor and the guiding rail of the first divider panel to separate the first or second enclosure volumes into additional enclosure volumes.

9. The adjustable truck compartment of claim 1, wherein the temperature control system regulates the temperature within the first and second enclosure volumes such that the temperature within the first enclosure volume is different from the temperature within the second enclosure volume.

10. The adjustable truck compartment of claim 1, comprising an item receiving assembly extending from the first side wall and the second side wall.

11. The adjustable truck compartment of claim 10, wherein the item receiving assembly includes a plurality of hooks each configured to receive a bag in a hanging configuration.

12. An adjustable truck compartment, comprising:

a first side wall defining a proximal end and a distal end, the first side wall including a first guiding rail extending between the proximal end and the distal end;

a second side wall disposed opposite from the first side wall, the second side wall defining a proximal end and a distal end, the second side wall including a second guiding rail extending between the proximal end and the distal end of the second side wall;

a rear wall coupled to the distal ends of the first and second side walls to define an enclosure between the first side wall, the second side wall, and the rear wall; and a first divider panel configured to be received by the first and second guiding rails and within the enclosure in an orientation parallel to a floor of the enclosure to separate the enclosure into a first enclosure volume and a second enclosure volume;

wherein:

the first divider panel includes one or more guiding rails on one or more sides of the first divider panel;

the adjustable truck compartment comprises a temperature control system including one or more sensors configured to detect a temperature within the enclosure;

the adjustable truck compartment comprises one or more volume sensors configured to detect a volume of the first and second enclosure volumes; and the adjustable truck compartment comprises a volume determination system configured to (i) receive as input data representative of a desired volume of at least one of the first and second enclosure volumes, (ii) determine whether the detected volume of at least one of the first and second enclosure volumes is equal to or greater than the desired volume, and (iii) if the detected volume of the first and second enclosure volumes is less than the desired volume, output a new position of the first divider panel to achieve the desired volume in at least one of the first and second enclosure volumes.

* * * * *

UNITED STATES PATENT AND TRADEMARK OFFICE
CERTIFICATE OF CORRECTION

PATENT NO. : 11,634,083 B2
APPLICATION NO. : 17/174148
DATED : April 25, 2023
INVENTOR(S) : Sai Phaneendra Sri Harsha Viswanath Putcha and Amit Batra Page 1 of 1

It is certified that error appears in the above-identified patent and that said Letters Patent is hereby corrected as shown below:

In the Claims

In Column 12, Claim 3, Line 17, delete "enclosures volumes." and insert -- enclosure volumes. --, therefor.

In Column 12, Claim 6, Line 29, delete "enclosures volumes." and insert -- enclosure volumes. --, therefor.

Signed and Sealed this
Twenty-sixth Day of September, 2023

Katherine Kelly Vidal
*Director of the United States Patent and Trademark Office*